(12) United States Patent
Riach et al.

(10) Patent No.: US 7,882,380 B2
(45) Date of Patent: Feb. 1, 2011

(54) WORK BASED CLOCK MANAGEMENT FOR DISPLAY SUB-SYSTEM

(75) Inventors: Duncan A. Riach, East Sussex (GB); Michael A. Ogrinc, San Francisco, CA (US); Leslie E. Neft, Mountain View, CA (US)

(73) Assignee: NVIDIA Corporation, Santa Clara, CA (US)

( * ) Notice: Subject to any disclaimer, the term of this patent is extended or adjusted under 35 U.S.C. 154(b) by 519 days.

(21) Appl. No.: 11/690,093

(22) Filed: Mar. 22, 2007

(65) Prior Publication Data

US 2007/0250728 A1 Oct. 25, 2007

Related U.S. Application Data

(60) Provisional application No. 60/794,221, filed on Apr. 20, 2006.

(51) Int. Cl.
*G06F 1/00* (2006.01)

(52) U.S. Cl. .................................................. 713/322

(58) Field of Classification Search .................. 713/322
See application file for complete search history.

(56) References Cited

U.S. PATENT DOCUMENTS

| | | |
|---|---|---|
| 3,922,526 A | 11/1975 | Cochran |
| 4,317,180 A | 2/1982 | Lies |
| 4,468,748 A | 8/1984 | Blau et al. |
| 4,615,005 A | 9/1986 | Maejima et al. |
| 4,670,837 A | 6/1987 | Sheets |
| 4,695,946 A | 9/1987 | Andreasen et al. |
| 4,698,748 A | 10/1987 | Juzswik et al. |
| 4,748,559 A | 5/1988 | Smith et al. |
| 4,766,566 A | 8/1988 | Chuang |
| 4,893,271 A | 1/1990 | Davis et al. |

(Continued)

FOREIGN PATENT DOCUMENTS

DE 4040382 A1 7/1991

(Continued)

OTHER PUBLICATIONS

Wirbel, L., "AMD about to announce 80486 clone," Electronic Engineering Times, A CMP Publication, pp. 1 and 8 (Jan. 13, 1992).

(Continued)

*Primary Examiner*—Thomas Lee
*Assistant Examiner*—Mohammed H Rehman
(74) *Attorney, Agent, or Firm*—Townsend and Townsend and Crew LLP (57) ABSTRACT

A system and method for enabling or disabling clocks to one or more portions of hardware circuitry, for example a display sub-system of a personal computer. A processor generates a command or data to a first circuit configured to perform a function based at least on the command or data. A clock generator selectively supplies clocks to the first circuit and a second circuit configured to perform a second function. A software interface circuit coupled to the processor and the clock generator autonomously determines based at least on the command or data whether the second circuit will perform the second function or be idle in an upcoming period and disables one or more of the clocks to the second circuit if the second circuit will be idle in the upcoming period.

16 Claims, 4 Drawing Sheets

U.S. PATENT DOCUMENTS

| | | | |
|---|---|---|---|
| 4,894,728 A | 1/1990 | Goodman | |
| 4,954,951 A | 9/1990 | Hyatt | |
| 4,963,769 A | 10/1990 | Hiltpold et al. | |
| 5,113,523 A | 5/1992 | Colley et al. | |
| 5,150,469 A | 9/1992 | Jouppi | |
| 5,153,535 A | 10/1992 | Fairbanks et al. | |
| 5,167,024 A | 11/1992 | Smith et al. | |
| 5,265,256 A | 11/1993 | Chau-Lee et al. | |
| 5,274,828 A | 12/1993 | McAdams | |
| 5,452,401 A | 9/1995 | Lin | |
| 5,630,143 A | 5/1997 | Maher et al. | |
| 5,655,124 A | 8/1997 | Lin | |
| 5,787,297 A | 7/1998 | Lin | |
| 5,940,785 A | 8/1999 | Georgiou et al. | |
| 6,047,248 A | 4/2000 | Georgiou et al. | |
| 6,105,139 A | 8/2000 | Dey et al. | |
| 6,195,756 B1 | 2/2001 | Hurd | |
| 6,247,134 B1 | 6/2001 | Sproch et al. | |
| 6,256,743 B1 | 7/2001 | Lin | |
| 6,301,671 B1 | 10/2001 | Boice et al. | |
| 6,430,693 B2 | 8/2002 | Lin | |
| 6,438,700 B1 | 8/2002 | Adusumilli | |
| 6,671,815 B2 | 12/2003 | Iwamura et al. | |
| 6,919,900 B2 * | 7/2005 | Wilt | 345/535 |
| 7,081,896 B1 * | 7/2006 | Rao et al. | 345/534 |
| 7,082,543 B2 | 7/2006 | Lin | |
| 2002/0073369 A1 * | 6/2002 | How et al. | 714/724 |
| 2005/0235135 A1 * | 10/2005 | Dao et al. | 713/1 |
| 2006/0132491 A1 * | 6/2006 | Riach et al. | 345/505 |

FOREIGN PATENT DOCUMENTS

| | | | |
|---|---|---|---|
| EP | 0284364 | A2 | 9/1988 |
| EP | 0284364 | A3 | 9/1988 |
| EP | 0442240 | A2 | 8/1991 |
| JP | 54-014624 | | 2/1979 |
| JP | 58-062720 | | 4/1983 |
| JP | 63-026716 | | 2/1988 |
| JP | 63-175910 | | 7/1988 |
| JP | 1-155459 | | 6/1989 |
| JP | 2-066616 | | 3/1990 |
| JP | 3-010306 | | 1/1991 |
| JP | S58-182760 | | 10/1993 |

OTHER PUBLICATIONS

Colwell, R.P. et al., "A VLIW Architecture for a Trace Scheduling Compiler," IEE Transactions on Computers, IEEE, vol. 37, No. 8, pp. 967-979 (Aug. 1988).

Dobberpuhl, D. et al., "A 200MHz 64b Dual-Issue CMOS Microprocessor," 1992 IEEE International Solid-State Circuits Conference Digest of Papers, IEEE, First Edition, IEEE Catalog No. 92CH3128-6, pp. 106-107 (Feb. 1992).

Towler, J. et al., "A 128k 6.5ns Access/5ns Cycle CMOS ECL Static RAM," 1989 IEE International Solid-State Circuits Conference Digest of Technical Papers, IEEE, First Edition, ISSN No. 0193-6530, pp. 30-31 and 280 (Feb. 1989).

English-language Abstract of Japanese Patent Publication No. 63-026716, from http://www1.ipdl.jpo.go.jp, 1 page (Feb. 4, 1988—Date of publication of application).

English-language Abstract of Japanese Patent Publication No. 02-066616, from http://www1.ipdl.jpo.go.jp, 1 page (Mar. 6, 1990—Date of publication of application).

English Translation of German Patent Publication No. DE 40 40 382 A1, 81 pages including cover sheet and figures.

English Translation of Japanese Patent Publication No. S63-26716, 7 pages.

English Translation of Japanese Patent Publication No. H2-66616, 7 pages.

* cited by examiner

WORK BASED CLOCK MANAGEMENT FOR DISPLAY SUB-SYSTEM

CROSS-REFERENCES TO RELATED APPLICATIONS

This application claims the benefit of U.S. Provisional Application No. 60/794,221, filed Apr. 20, 2006, entitled "WORK BASED CLOCK MANAGEMENT FOR DISPLAY SUB-SYSTEM," the disclosure of which is incorporated herein by reference in their entirety.

BACKGROUND OF THE INVENTION

Generally, the present disclosure pertains to power savings in electronic circuitry, for example, as practiced in clock management for a display subsystem as may be found in a personal computer (PC) or laptop PC.

Figure 1:
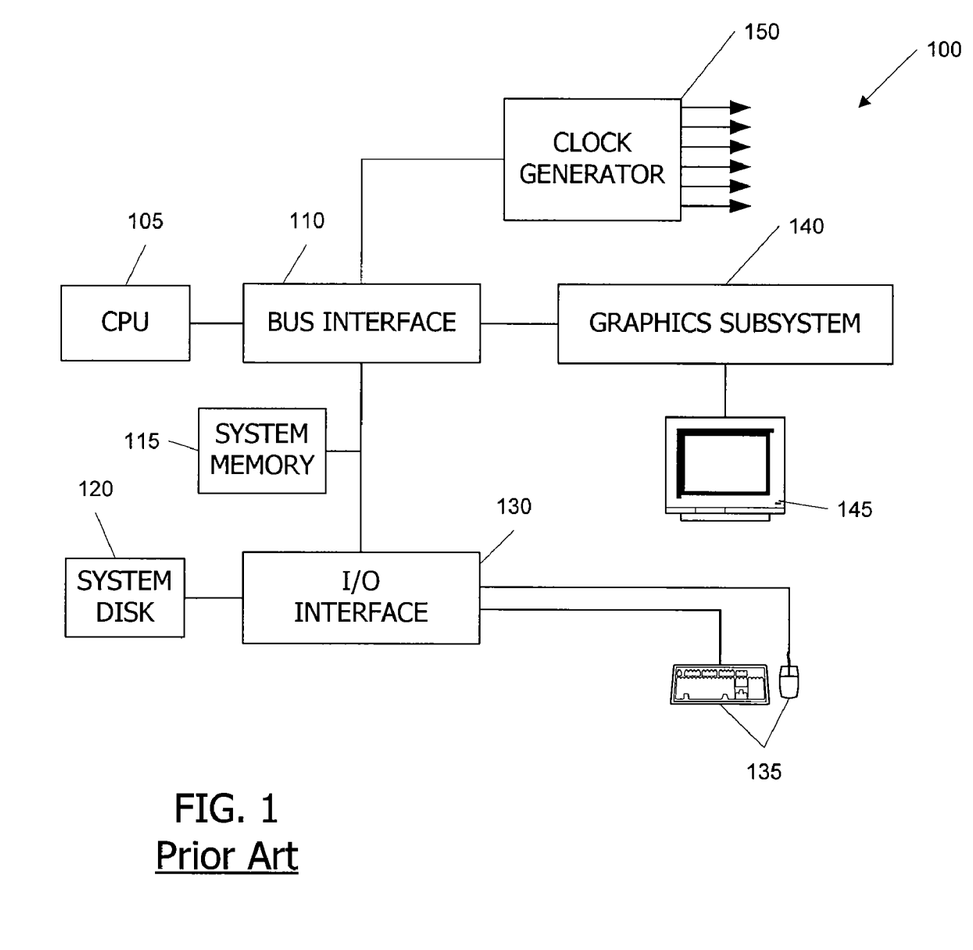
FIG. 1 is a generalized block diagram of a computer system in the prior art.

FIG. 1 is a generalized block diagram of a computer system 100 in the prior art. In the computer system 100, central processing unit (CPU) 105 communicates via bus interface 110 to system memory 115. I/O interface 130 receives user input from one or more user input devices 135 (e.g., keyboard, mouse) and forwards the input to CPU 105. Visual output is provided on display device 145 (e.g., a CRT or LCD monitor) by way of graphics subsystem 140. System disk 120 (e.g., hard drive) is connected to I/O interface 130 or bus interface 110.

Clock generator 150 supplies clocks at a variety of frequencies to the various components of computer system 100. For example, clock generator 150 may provide a number of different clocks (e.g., at different frequencies) to drive the various hardware circuits within graphics subsystem 140. Clock generator 150 may supply a digital-to-analog converter (DAC, not shown) in graphics subsystem 140 with one or more clocks so that the DAC can generate an analog signal to display device 145, while clock generator 150 may also supply another circuit component such as I/O interface 130 with other clocks. The clocks are needed so that the various hardware circuitry in computer system 100 may perform their respective functions.

However, at any point in time, some portions of the circuitry in computer system 100 may be idle and not performing a needed function. While the circuitry is idle, computer system 100 may disable clocks to the idle circuitry in order to save power. For example, to extend battery life where computer system 100 is a laptop PC, a software component running on CPU 105 may command clock generator 150 to disable one or more of the clocks supplied to the idle circuitry.

However, providing a software component in computer system 100 to control enabling and disabling of clocks supplied by clock generator 150 has limitations. For example, providing a clock management function in a software component increases the overall complexity of the software running on CPU 105. Further, software intervention incurs delay, because it may take a relatively long time for the software to determine that a portion of the circuitry in computer system 100 is idle, determine whether clocks to the idle circuitry may be safely disabled, and then send commands or signals to clock generator 150 to disable the clocks.

Additionally, a software component running on CPU 105 may not always be "aware" of the exact state of the hardware in computer system 100. Therefore, there may be some inefficiency in deciding which clocks to disable or uncertainty as to when the clocks may be safely disabled. In an egregious case, software can "hang" or crash if one software component has disabled a portion of logic and another software component tries to write to the disabled logic. In some circumstances it may be possible for software to read the status of the hardware before writing to it, but providing such mechanisms increases the complexity of both the software and the hardware in computer system 100.

BRIEF SUMMARY OF THE INVENTION

In one aspect, a system comprises a processor configured to generate a command or data to a first circuit that is configured to perform a first function based at least on the command or data, a second circuit configured to perform a second function, a clock generator configured to selectively supply one or more clocks to the first circuit and the second circuit, and a software interface circuit coupled to the processor and the clock generator. The software interface circuit is configured to autonomously determine based at least on the command or data whether the second circuit will perform the second function or be idle in an upcoming period, and disable one or more of the clocks to the second circuit if the second circuit will be idle in the upcoming period.

In some embodiments, the software interface circuit is further configured to determine that the first circuit will be functional in the upcoming period but is currently idle, and enable the one or more clocks to the first circuit prior to the upcoming period. In some embodiments, the processor may be further configured to transmit a state command to the software interface circuit, and the software interface circuit is configured to determine whether the second circuit will perform the second function or be idle in the upcoming period based at least upon the state command. In some embodiments, the upcoming period may comprise a period to write data to the first circuit, for example, or where the system comprises an isochronous graphics engine, the upcoming period may be a refresh cycle. In some embodiments, the clock generator may be further configured to send an acknowledgment to the software interface circuit after a predetermined time for disabling the one or more clocks to the second circuit.

In another aspect, a method comprises generating a command or data in a processor; sending the command or data from the processor to a first circuit configured to perform a first function based at least on the command or data; supplying one or more clocks to the first circuit and a second circuit configured to perform a second function; autonomously determining in a software interface circuit coupled to the processor and the clock generator whether the second circuit will perform the second function or be idle in an upcoming period, based at least on the command or data; and disabling one or more of the clocks to the second circuit if the second circuit will be idle in the upcoming period.

DETAILED DESCRIPTION OF THE INVENTION

Generally, the present disclosure concerns a system and method for disabling or enabling clocks to one or more portions of hardware circuitry, based on commands and/or data sent from a processor to the hardware circuitry. In general, a software interface circuit receives all or substantially all communications from the processor to the hardware circuitry, either by being in the path of communications or by "sniffing" the communications. The software interface circuit determines, based on the commands and/or data sent by the processor, which portions of the hardware circuitry will need to be enabled in an upcoming period, and which portions will be idle in the upcoming period. For the portions of the hardware circuitry that will be idle in the upcoming period, the software interface circuit of disables one or more clocks to idle circuitry, for example by commanding a clock generator to disable the one or more clocks. In an exemplary embodiment, the hardware circuitry is a isochronous display sub-system of a personal computer.

Figure 2:
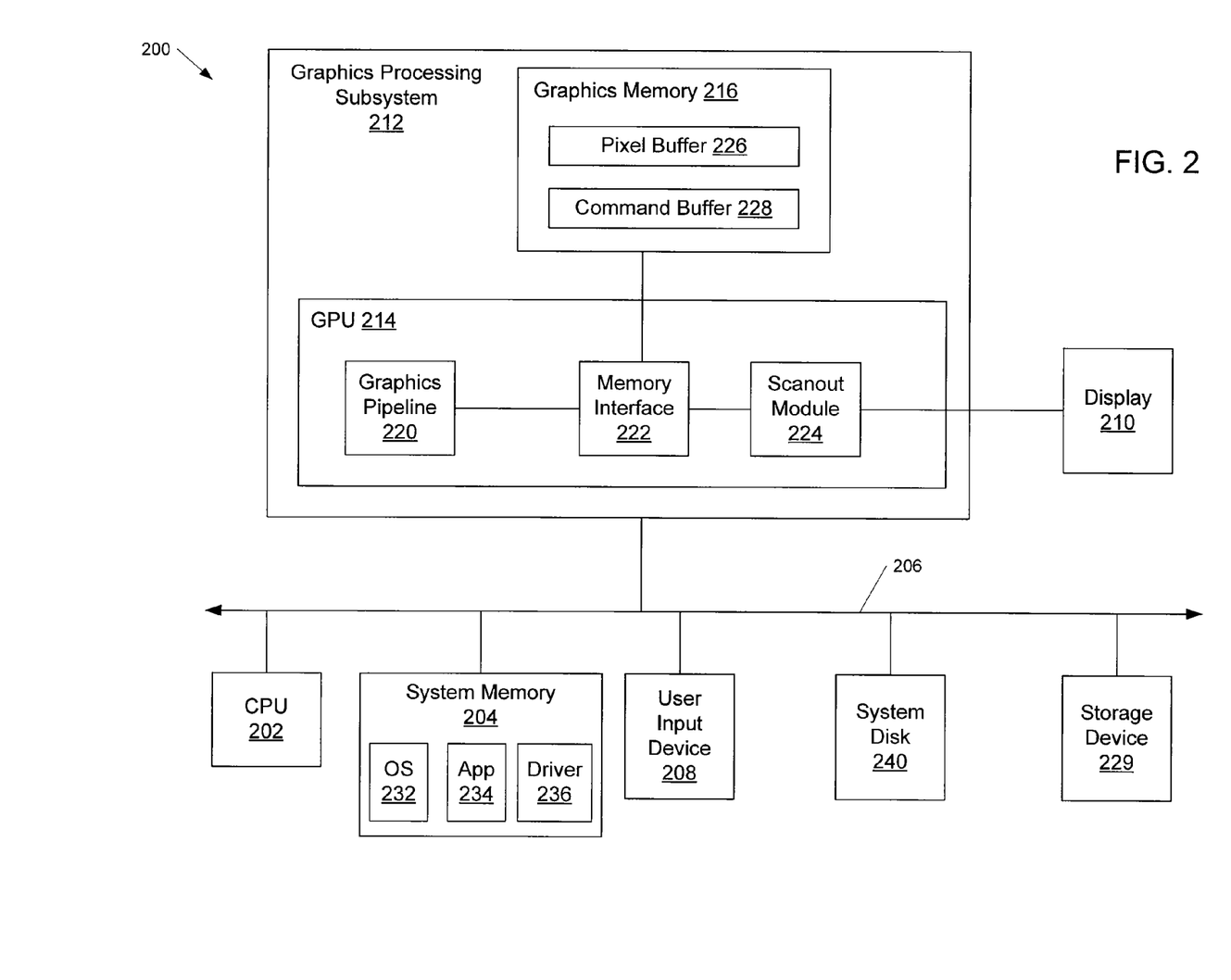
FIG. 2 is a block diagram of a computer system according to an embodiment of the present invention.

FIG. 2 is a block diagram of a computer system 200 according to an embodiment of the present invention. Computer system 200 includes central processing unit (CPU) 202 and system memory 204 communicating via bus 206. User input is received from one or more user input devices 208 (e.g., keyboard, mouse) coupled to bus 206. Visual output is provided on pixel-based display device 210 (e.g., a conventional CRT or LCD based monitor) operating under control of graphics processing subsystem 212 coupled to system bus 206. System disk 240 and other components, such as one or more removable storage devices 229 (e.g., floppy disk drive, compact disk (CD) drive, and/or DVD drive), may also be coupled to system bus 206. System bus 206 may be implemented using one or more of various bus protocols including PCI (Peripheral Component Interconnect), AGP (Advanced Graphics Processing) and/or PCI-Express (PCI-E); appropriate "bridge" chips such as a north bridge and south bridge (not shown) may be provided to interconnect various components and/or buses.

Graphics processing subsystem 212 is an isochronous pipelined processor with deterministic control for generating images on display device 210. As used herein, an isochronous processor includes any data processing device that is configured to receive input data and/or deliver output data on a prescribed schedule. For instance, isochronous graphics processing subsystem 212 may be configured to deliver output signals to display device 210 at a prescribed frame rate, which may be a programmable rate. The isochronous pipelined graphics processor is further described in U.S. patent application Ser. No. 10/901,887, filed Jul. 28, 2004, entitled "Isochronous Pipelined Processor with Deterministic Control," which is incorporated by reference herein as if set forth fully. To focus on the present invention the isochronous pipelined graphics processor is described generally below, with specific details believed to be unnecessary to understanding of the present invention omitted from the present disclosure.

Graphics processing subsystem 212 includes graphics processing unit (GPU) 214 and graphics memory 216, which may be implemented, e.g., using one or more integrated circuit devices such as programmable processors, application specific integrated circuits (ASICs), and memory devices. GPU 214 includes graphics pipeline 220, memory interface module 222, and scanout module 224. Graphics pipeline 220 may be configured to perform various tasks related to generating pixel data from graphics data supplied via system bus 206 (e.g., implementing various 2D and or 3D rendering algorithms), interacting with graphics memory 216 to store and update pixel data, and the like. Memory interface module 222, which communicates with graphics pipeline 220 and scanout module 224, manages all interactions with graphics memory 216. Memory interface module 222 may also include pathways for writing pixel data received from system bus 206 to graphics memory 216 without processing by graphics pipeline 220.

Graphics memory 216, which may be implemented using one or more integrated circuit memory devices of generally conventional design, may contain various physical or logical subdivisions, such as pixel buffer 226 and command buffer 228. Pixel buffer 226 stores pixel data for an image (or for a part of an image) that is read and processed by scanout module 224 and transmitted to display device 210 for display. This pixel data may be generated, e.g., from 2-D or 3-D scene data provided to graphics pipeline 220 of GPU 214 via system bus 206 or generated by various processes executing on CPU 202 and provided to pixel buffer 226 via system bus 206. In some embodiments, pixel buffer 226 can be double-buffered so that while data for a first image is being read for display from a "front" buffer, data for a second image can be written to a "back" buffer without affecting the currently displayed image. Command buffer 228 queues commands received via system bus 206 for execution by graphics pipeline 220 and/or scanout module 224. Other portions of graphics memory 216 may be used to store data required by GPU 214 (such as texture data, color lookup tables, etc.), executable program code for GPU 214 and so on.

Scanout module 224, which may be integrated in a single chip with GPU 214 or implemented in a separate chip, reads pixel color data from pixel buffer 226, processes the pixel color data, and transfers the processed pixel data to display device 210 to be displayed. In one embodiment, scanout module 224 operates isochronously, scanning out frames of pixel data at a prescribed refresh rate (e.g., 80 Hz) regardless of any other activity that may be occurring in GPU 214 or elsewhere in system 200. In some embodiments, the prescribed refresh rate can be a user selectable parameter, and the scanout order may be varied as appropriate to the display format (e.g., interlaced or progressive scan). Scanout module 224 may also perform other operations, such as adjusting color values for particular display hardware and/or generating composite screen images by combining the pixel data from pixel buffer 226 with data for a video or cursor overlay image or the like, which may be obtained, e.g., from graphics memory 216, system memory 204, or another data source (not shown). Such operations are performed in a display pipeline of scanout module 224.

During operation of system 200, CPU 202 executes various programs that are (temporarily) resident in system memory 204. In one embodiment, these programs include one or more operating system (OS) programs 232, one or more application programs 234, and one or more driver programs 236 for graphics processing subsystem 212. It is to be understood that, although these programs are shown as residing in system memory 204, the invention is not limited to any particular mechanism for supplying program instructions for execution by CPU 202. For instance, at any given time some or all of the program instructions for any of these programs may be present within CPU 202 (e.g., in an on-chip instruction cache and/or various buffers and registers), in a page file or memory mapped file on system disk 240, and/or in other storage space.

Operating system programs 232 and/or application programs 234 may be of conventional design. Application program 234 may be, for instance, a video game program that generates graphics data and invokes appropriate rendering functions of GPU 214 (e.g., graphics pipeline 220) to transform graphics data to pixel data. Another application program 234 may generate and provide pixel data to graphics processing subsystem 212 for display. It is to be understood that any number of application programs that generate pixel and/or graphics data may execute concurrently on CPU 202. Operating system programs 232 (e.g., the Graphical Device Interface (GDI) component of the Microsoft Windows operating system) may also generate pixel and/or graphics data to be processed by graphics processing subsystem 212.

Driver program 236 enables communication with graphics processing subsystem 212, including both graphics pipeline 220 and scanout module 224. Driver program 236 advantageously implements one or more standard application program interfaces (APIs), such as OpenGL, Microsoft DirectX, or D3D for communication with graphics processing subsystem 212; any number or combination of APIs may be supported, and in some embodiments separate driver programs 236 are provided to implement different APIs. By invoking appropriate API function calls, operating system programs 232 and/or application programs 234 are able to instruct driver program 236 to transfer graphics data or pixel data to graphics processing subsystem 212 via system bus 206, to control operations of graphics pipeline 220, to modify state parameters for scanout module 224, and so on. The specific commands and/or data transmitted to graphics processing subsystem 212 by driver program 236 in response to an API function call may vary depending on the implementation of GPU 214, and driver program 236 may also transmit commands and/or data implementing additional functionality (e.g., special visual effects) not controlled by operating system programs 232 or application programs 234.

In some embodiments, command buffer 228 queues commands received via system bus 206 for execution by GPU 214. More specifically, driver program 236 may write a command stream to command buffer 228; the stream may include rendering commands and data for graphics pipeline 220 as well as state commands for scanout module 224. In some embodiments, command buffer 228 may include logically or physically separate sections for commands directed to graphics pipeline 220 and commands directed to scanout module 224; in other embodiments, the commands may be intermixed in command buffer 228 and directed to the appropriate pipeline by suitable control circuitry within GPU 214.

Command buffer 228 (or each section thereof) is a first-in, first-out buffer (FIFO) written by CPU 202 and read by GPU 214. Reading and writing can occur asynchronously. In one embodiment, CPU 202 periodically writes new commands and data to command buffer 228 at a location determined by a "put" pointer, which CPU 202 increments after each write. Asynchronously, GPU 214 may continuously read and process commands and data sets previously stored in command buffer 228. GPU 214 maintains a "get" pointer to identify the read location in command buffer 228, and the get pointer is incremented after each read. Provided that CPU 202 stays sufficiently far ahead of GPU 214, GPU 214 is able to render images without incurring idle time waiting for CPU 202. In some embodiments, depending on the size of the command buffer and the complexity of a scene, CPU 202 may write commands and data sets for frames several frames ahead of a frame being rendered by GPU 214. Command buffer 228 may be of fixed size (e.g., 5 megabytes) and may be written and read in a wraparound fashion (e.g., after writing to the last location, CPU 202 may reset the "put" pointer to the first location).

In some embodiments, execution of rendering commands by graphics pipeline 220 need not be synchronized with operation of scanout module 224. For example, where pixel buffer 226 is double-buffered as mentioned above, graphics pipeline 220 can freely overwrite the back buffer while scanout module 220 reads from the front buffer. Thus, graphics pipeline 220 may read and process commands as they are received. Flipping of the back and front buffers can be synchronized with the end of a scanout frame. For example, when graphics pipeline 220 has completed a new image in the back buffer, operation of graphics pipeline 220 may be paused until the end of scanout for the current frame, at which point the buffers may be flipped. Various techniques for implementing such synchronization features are omitted as not being critical to understanding the present invention.

Figure 3:
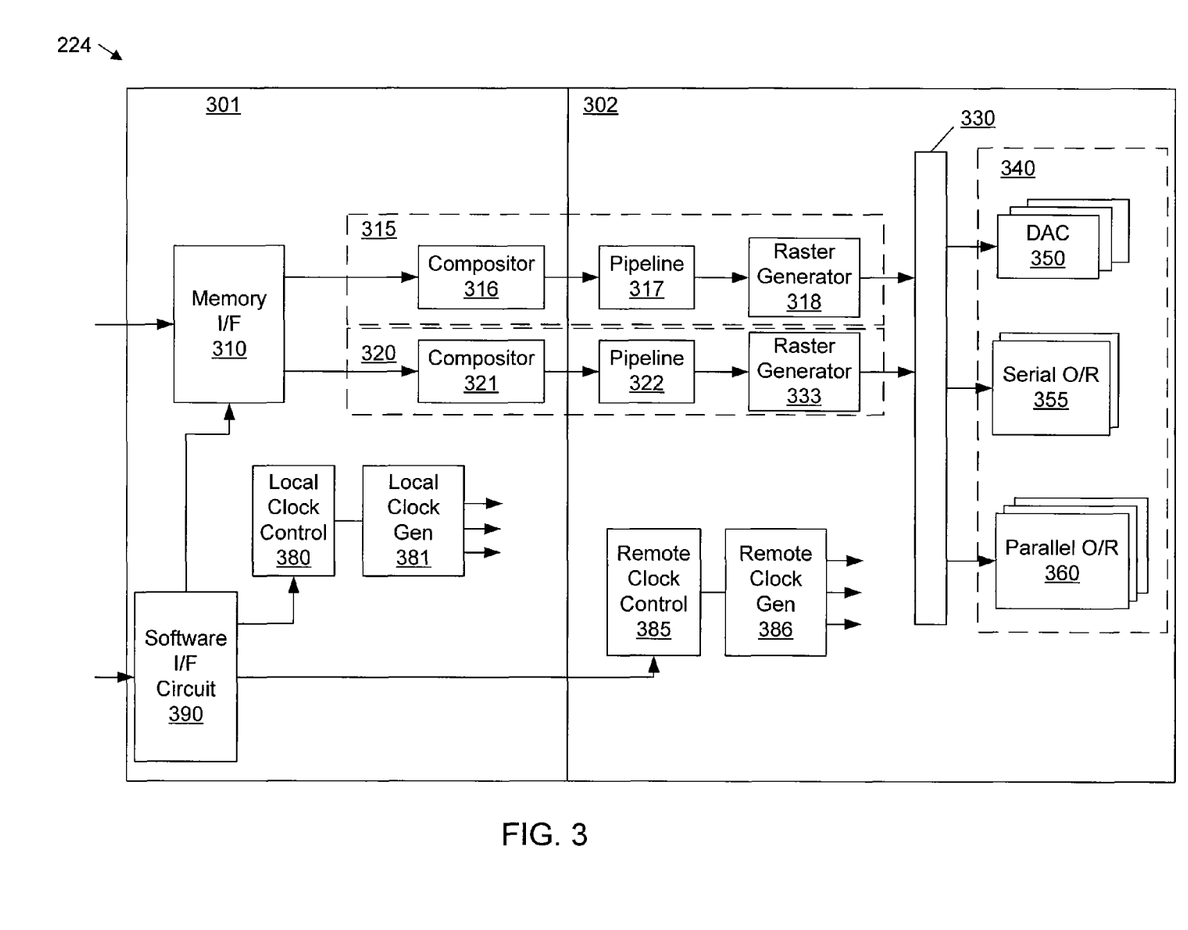
FIG. 3 illustrates further detail of the scanout module of FIG. 2 including a software interface circuit configured to autonomously disable clocks to one or more portions of the scanout module, in one embodiment in accordance with the present invention.

FIG. 3 illustrates further detail of scanout module 224 of FIG. 2 including a software interface circuit 390 configured to autonomously disable clocks to one or more portions of scanout module 224, in one embodiment in accordance with the present invention. In this embodiment, scanout module 224 is partitioned into two physical integrated circuits (ICs), local IC 301 and remote IC 302. However, scanout module 224 may comprise one or any number of ICs.

To process pixel data for display 210, memory interface 310 receives data for processing by one or both of two parallel pixel processing heads, first head 315 and second head 320. In some embodiments, heads 315 and 320 may simultaneously drive up to two displays 210, for example. Head 315 includes compositor 316, data pipeline 317, and raster generator 318. Similarly, head 320 includes, in parallel, compositor 321, data pipeline 322, and raster generator 333. To drive one or more displays 210, processed video data are output from the heads 315 and/or 320 via virtual crossbar 330 to one or more output resources 340, which include DACs 350, serial output resources 355, and parallel output resources 360.

Local clock control module 380 in conjunction with local clock generator 381 selectively supplies clocks for distribution within local IC 301. Similarly, remote clock control module 385 in conjunction with remote clock generator 386 selectively supplies clocks for distribution within remote IC 302. Although depicted and described as separate modules, in some embodiments local clock control module 380 has all or parts of its functions integrated into local clock generator 381, and remote clock control module 385 has all or parts of its functions integrated into remote clock generator 386. As described further herein, selective clock distribution is controlled by software interface circuit 390.

Software interface circuit 390 is configured to determine, based on commands and/or data received by scanout module 224, which portions of scanout module 224 need to be enabled in an upcoming period, and which portions will be idle in the upcoming period. Depending upon the functions to be performed by the various components within scanout module 224 in the upcoming period, software interface circuit 390 dynamically determines and controls the functional configuration (which portions are functioning and which are idle) of scanout module 224. For the portions of scanout module 224 that will be functional in the upcoming period but that are currently idle, software interface circuit 390 enables clocks to the circuitry in advance or coincident with the beginning of the upcoming period. For the portions of scanout module 224 that will be idle in the upcoming period, software interface circuit 390 may disable one or more clocks to the idle circuitry.

In one embodiment, software interface circuit 390 commands local clock control module 380 for local IC 301 and remote clock control module 385 for remote IC 302 according to the functional configuration. Software interface circuit 390 therefore appropriately enables or disables one or more clocks supplied by local clock generator 381 and remote clock generator 386, respectively, to the components of scanout module 224.

To determine the functional configuration of scanout module 224 in the upcoming period, software interface circuit 390 receives and interprets substantially all communications coming into scanout module 224. In some embodiments, software interface circuit 390 directly receives state commands from CPU 202 indicating the functional configuration in the upcoming period. For example, software running on CPU 202 or graphics processing subsystem 212 may send commands and/or data via memory-mapped register writes to software interface circuit 390. Software interface circuit 390 determines state information for the upcoming period from the commands and/or data. The state information is updated atomically and becomes the functional configuration of scanout module 224. Based on the functional configuration, software interface circuit 390 determines those portions of scanout module 224 that need to be enabled or may be disabled in the upcoming period.

In other embodiments, software interface circuit 390 receives commands and/or data indirectly, e.g., by "sniffing" bus traffic and interprets the functional configuration therefrom. There are a number of bus interfaces (not shown) between the software interface circuit 390 and other components within scanout module 224, and the upcoming period may be a duration for receiving data over one of the buses and a corresponding write to hardware. For example, if a software command is interpreted by software interface circuit 390 as indicating that software intends to write to a register in head 315 in an upcoming register write period, and clocks to head 315 are currently disabled, then software interface circuit 390 enables the clocks a predetermined time before transmitting the data to the register in head 315. Once the register is written to, software interface circuit 390 can disable clocks to head 315 if there are no more registers to be written in head 315. In another example, software interface circuit 390 may determine that data will be written to configure one of the DACs 350 in an upcoming period. For the data to get from the software interface circuit 390 to DAC 350, software interface circuit 390 enables the appropriate clocks to DAC 350, and software interface circuit 390 will then write to DAC 350 in the upcoming period. Once the data is written and there is no further data to be written to DAC 350, then software interface circuit 390 may disable clocks to DAC 350.

The upcoming period may also correspond to a vertical scan out or raster scan period. For example, once per vertical scan out or raster scan period, software interface circuit 390 may determine a functional configuration for the next upcoming raster scan period. If in the upcoming raster scan period, for example, head 315 display logic will be functioning to generate video data while head 320 will be idle, then software interface circuit 390 may disable clocks to head 320 circuitry in the upcoming raster scan period. In another example, if the programming sequence is such that one of the DACs 350 is to be connected to either head 315 or head 320 to display an image on display 210 in an upcoming raster scan period, then software interface circuit 390 can enable the clocks to the appropriate DAC 350 for the period in which DAC 350 is to generate image data. When the software interface circuit 390 determines that the DAC 350 is no longer needed for display, then software interface circuit 390 can turn off the clocks to the DAC 350.

To effectively manage various functional hardware configurations in software interface circuit 390, resources in scanout module 224 are subdivided into a predetermined number of discrete clock domains. In one embodiment, clocks to software interface circuit 390, memory interface 310, local clock control module 380, and remote clock control module 385 comprise an always-on clock domain supplied with 400 MHz clocks. A first dynamic clock domain comprises head 315 display logic (compositor 316, data pipeline 317, and raster generator 318). A second dynamic clock domain comprises head 320 display logic (compositor 321, data pipeline 322, and raster generator 333). Each clock domain may include multiple clock frequencies or phases. For example, raster generators 318 and 333 may receive clocks different from and/or in addition to the clocks supplied to compositors 316 and 321 and data pipelines 317 and 322.

Other clock domains may be predetermined for one or more of output resources 340 such as DACs 350, serial output resources 355, and parallel output resources 360 that operate independently of each other but that operate in conjunction with head 315 display logic and/or head 320 display logic. Other clock domains may include other logic in scanout module 224, for example logic or circuitry that is not specific to any head or output resources.

Because scanout module 224 is isochronous in the exemplary embodiment, to optimally manage clock state, software interface circuit 390 needs the real-time functional configuration or state of hardware in scanout module 224. For example, software interface circuit 390 cannot merely enable or disable clocks to head 315, because the clocks to head 315 need to be running constantly while head 315 is processing data through data pipeline 317.

To enhance the accuracy of autonomous clock management in scanout module 224 in some embodiments, local clock control module 380 and/or remote clock control module 385 sends an acknowledgment (ACK) to software interface circuit 390 after a predetermined time for enabling or disabling the appropriate clock has elapsed. Software interface circuit 390 as "clock master" therefore has atomic knowledge of the state of hardware within scanout module 224, and can accurately time when to enable or disable particular clocks. For example, software interface circuit 390 may be programmed with a predetermined time (e.g., a predetermined worst-case value) for enabling clocks to head 315. If a command or data is to access a register in head 315, software interface circuit 390 can accurately time the enabling of head 315 so that head 315 will be on only just before the register write occurs in the upcoming write period. Because software interface circuit 390 acts as clock master over hardware components of scanout module 224, a software instruction can be considered as a request to send data to the register on head 315 and for software interface circuit 390 to coordinate clock enabling/disabling for head 315, enable the relevant command stream to head 315, and if no further communication is to access head 315, disable clocks to head 315. In this fashion, software interface circuit 390 advantageously frees software from needing to manage clock enabling and disabling in scanout module 224.

To eliminate clock enable/disable latency in some embodiments, software running on CPU 202 or graphics processing subsystem 212 can selectively enable or disable the autonomous clock management performed by software interface circuit 390. For example, during initialization or boot-up of the system 200, software may disable the automatic clock management mode to ensure that all elements of system 200 are enabled, for example to ensure during initialization that registers can be written to or read from reliably. Software may enable or disable autonomous clock management mode by memory-mapped write to the software interface circuit 390, for example.

Figure 4:
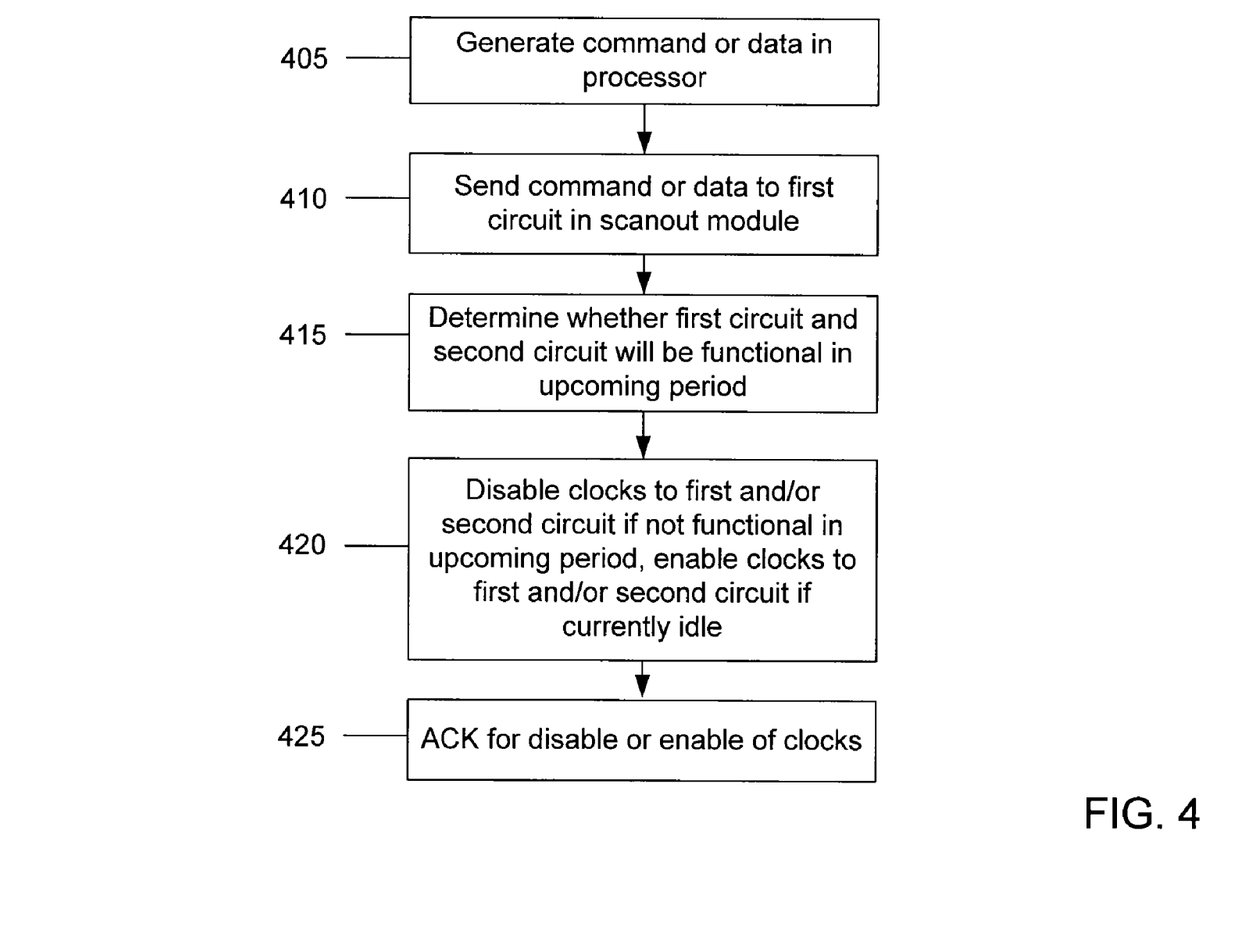
FIG. 4 illustrates a simplified method for work based clock management in the scanout module of FIGS. 2 and 3, in one embodiment in accordance with the present invention.

FIG. 4 illustrates a simplified method for work based clock management in the scanout module 224 of FIGS. 2 and 3, in one embodiment in accordance with the present invention. At step 405, software running on CPU 202 or graphics processing subsystem 212 generates command(s) and/or data for a first circuit (e.g., head 315) of scanout module 224. At step 410, software running on CPU 202 or graphics processing subsystem 212 sends the command and/or data to head 315. Optionally, the command and/or data may include a state command for software interface circuit 390.

At step 415, software interface circuit 390 of scanout module 224 receives the command and/or data (or state command) and determines, based on the commands and/or data, which portions of scanout module 224 need to be enabled in the upcoming period (e.g. head 315 needs to be enabled during a data write cycle to a register in head 315), and which portions will be idle in the upcoming period (e.g., DAC 350). At step 420, software interface circuit 390 enables clocks to the clock domain including head 315 prior to the upcoming period if the clocks are currently disabled to the clock domain including head 315. Additionally, software interface circuit 390 disables clocks to the clock domain including DAC 350 that will be idle in the upcoming period. At step 425, local clock control module 380 and/or remote clock control module 385 acknowledge (ACK) the enabling of clocks to head 315 and the disabling of clocks to DAC 350.

Although the method described with respect to FIG. 4 includes enabling and disabling of clocks for two circuits in scanout module 224, software interface circuit 390 can maintain the functional configuration for a virtually unlimited number of clock domains in scanout module 224. In some embodiments, the number of clock domains managed by the state machine implemented in software interface circuit 390 is relatively large and complex. As such, at step 415 of FIG. 4, software interface circuit 390 may determine that more than one clock domain needs to be enabled, and that more than one clock domain will be idle, in the upcoming period. Accordingly, at step 420, software interface circuit 390 may enable clocks for more than one clock domain, and disable clocks to more than one clock domain, in the upcoming period. Similarly, at step 425, various clock control modules may ACK enabling and disabling of clocks for a large number of clock domains.

In a traditional software-directed clock management scheme, a clock generator supplies clocks for each functional unit in the system, and software may disable each of the clocks, generally through memory-mapped register writes to the hardware. Where the system includes a data processing pipeline, the software needs to ensure that there is no data in the pipeline stages at the time that the clock is turned off. Typically, this synchronization is performed with a status signal coming back from the pipeline back to a memory-mapped location. The status signal indicates whether there is data in the pipeline unit such that the pipeline is idle. Upon reading this status signal via memory read, software can then direct clocks to be disabled for the pipeline.

In contrast to conventional clock management schemes in which software plays a controlling part in dynamically enabling or disabling clocks to certain portions of hardware, software interface circuit 390 autonomously determines when it is safe or appropriate to dynamically enable and/or disable clocks in scanout module 224. Because the software interface circuit 390 has an atomic view of the functional configuration of the other hardware elements within scanout module 224, software interface circuit 390 is advantageously more accurate in its determination of whether particular portions of scanout module 224 may be disabled by disabling clocks. Whereas a conventional software-directed mechanism for disabling clocks must leave the clocks enabled if there is any doubt as to whether the clocks can be disabled, software interface circuit 390 can disable the clocks relatively more often, and for relatively longer periods, so that software interface circuit 390 is relatively more efficient at clock management than a software-directed mechanism.

Having the software interface circuit 390 as a clock master in scanout module 224 dramatically reduces the latency for determining whether portions of hardware will be functioning and whether clocks must be enabled in the upcoming period, or whether hardware will be idle and clocks can be disabled, as compared to a traditional software-controlled clock management scheme. One advantage is that software interface circuit 390 control guarantees that clocks for the appropriate logic resources in a clock domain will be enabled when the software writes to those logic resources. Software interface circuit 390 is much faster at determining whether one of the clock domains may be disabled in an upcoming period, since there is no software in the loop. Generally, software interface circuit 390 ensures a controlled state in hardware for the software. A still further advantage is that software interface circuit 390 prevents race conditions and other issues from occurring when making clock on/off state transitions.

Software interface circuit 390 advantageously acts as a single coordination point that synchronizes software and hardware with respect to enabling or disabling clocks to clock domains in scanout module 224. In a software-controlled clock management scheme, it is possible for different threads of software to conflict in their respective determinations to enable or disable various portions of the hardware, and there is generally no single mechanism of hardware state management in software. Advantageously, software interface circuit 390 enforces order over the chaos of software.

Furthermore, software interface circuit 390 can disable clocks more often as compared to a software-controlled clock disable mechanism. To prevent errors or events such as race conditions in a software-controlled clock disable mechanism, if there is any doubt as to whether software may disable a portion of logic, the software keeps the logic enabled to prevent the race condition from occurring. In contrast, with hardware control via software interface circuit 390, a more accurate determination is made on whether a portion of logic can be safely disabled in scanout module 224. This provides a benefit in that the total amount of time that the portion of logic can be disabled is increased as compared to software-controlled scheme.

Although described with respect to graphics engine, the system and method apply generically to virtually any circuitry in which the circuitry is divided into a number of clock domains, a clock generator is configured to selectively supply one or more clocks to a first clock domain and a second clock domain, and a controller determines for an upcoming period whether one or more of the clock domains will be utilized in the upcoming period, and selectively enable and/or disable one or more clock domains depending on whether the clock domain will or will not be utilized during the upcoming period.

What is claimed is:

1. A system, comprising:
    a processor for generating a command or data;
    a first circuit in a first clock domain of a plurality of clock domains, the first circuit configured to receive the command or data and perform a first function based at least on the command or data;
    a second circuit in a second clock domain of the plurality of clock domains, the second circuit configured to perform a second function;
    a clock generator configured to selectively supply a plurality of clock signals to the plurality of clock domains, the plurality of clock signals including one or more clock signals for the first circuit and one or more clock signals for the second circuit; and a software interface circuit coupled to the processor and the clock generator, the software interface circuit configured to autonomously determine based at least on the command or data whether the first circuit will perform the first function or be idle in an upcoming period and whether the second circuit will perform the second function or be idle in the upcoming period, to disable one or more of the clock signals to the first circuit if the first circuit will be idle in the upcoming period, and to disable one or more of the clock signals to the second circuit if the second circuit will be idle in the upcoming period, wherein the software interface circuit is further configured to receive a second command, the second command instructing the software interface circuit to enable the one or more clock signals to the first circuit and the one or more clock signals to the second circuit whether or not the first circuit and the second circuit will be idle in the upcoming period, wherein the one or more of the clock signals to the first circuit and the one or more of the clock signals to the second circuit may be independently disabled.

2. The system of claim 1, wherein the software interface circuit is further configured to determine that the first circuit will be functional in the upcoming period but is currently idle, and to enable the one or more clock signals to the first circuit prior to the upcoming period.

3. The system of claim 1, wherein the processor is further configured to transmit a state command to the software interface circuit, and the software interface circuit is configured to determine whether the second circuit will perform the second function or be idle in the upcoming period based at least upon the state command.

4. The system of claim 1, wherein the upcoming period comprises a period to write data to the first circuit.

5. The system of claim 1, wherein the software interface circuit is further configured to autonomously determine based on at least the command or data a number of clock domains of the plurality of clock domains that will be idle in the upcoming period, and to disable the clock signals for the clock domains that will be idle in the upcoming period.

6. The system of claim 1, wherein the clock generator is further configured to supply one or more clock signals that may not be disabled.

7. The system of claim 1, wherein the clock generator is further configured to send an acknowledgment to the software interface circuit after a predetermined time for disabling the one or more clock signals to the second circuit.

8. The system of claim 1, wherein the system comprises a scanout engine.

9. The system of claim 8, wherein the scanout engine is isochronous and the upcoming period is a refresh cycle.

10. A method, comprising:

generating a command or data in a processor;

sending the command or data from the processor to a first circuit configured to perform a first function based at least on the command or data, wherein the first circuit is within a first clock domain of a plurality of clock domains;

selectively supplying one or more clock signals to the first circuit and one or more clock signals to a second circuit configured to perform a second function, wherein the second circuit is within a second clock domain of the plurality of clock domains;

autonomously determining in a software interface circuit coupled to the processor and the clock generator whether the first circuit will perform the first function or be idle in an upcoming period and whether the second circuit will perform the second function or be idle in the upcoming period, based at least on the command or data;

disabling one or more of the clock signals to the first circuit if the first circuit will be idle in the upcoming period;

disabling one or more of the clock signals to the second circuit if the second circuit will be idle in the upcoming period; and determining in the software interface circuit whether the first circuit will be functional in the upcoming period and is currently idle, and if the first circuit will be functional in the upcoming period and is currently idle, enabling the one or more clock signals to the first circuit prior to the upcoming period, wherein the one or more of the clock signals to the first circuit may be disabled independently with the one or more of the clock signals to the second circuit.

11. The method of claim 10, further comprising determining in the software interface circuit that the first circuit will perform the first function in a first upcoming period but is currently idle and enabling one or more of the clock signals for the first circuit prior to the first upcoming period, and determining in the software interface circuit that the first circuit will be idle in a second upcoming period and disabling one or more of the clock signals for the first circuit for the second upcoming period.

12. The method of claim 10, wherein the command or data comprises a state command and the software interface circuit is configured to determine whether the second circuit will perform the second function or be idle in the upcoming period based at least upon the state command.

13. The method of claim 10, wherein the upcoming period comprises a period to write data to the first circuit.

14. The method of claim 10, further comprising receiving an acknowledgment in the software interface circuit, the acknowledgement being sent after a predetermined time for disabling the one or more clocks to the second circuit.

15. The method of claim 10, further comprising sending a command from the processor to the software interface circuit to always enable clock signals in the system.

16. A system, comprising:

a processor for generating a command or data;

a first circuit configured to receive the command or data and perform a first function based at least on the command or data, wherein the first circuit is within a first clock domain of a plurality of clock domains;

a second circuit configured to perform a second function, wherein the second circuit is within a second clock domain of the plurality of clock domains;

a clock generator configured to selectively supply a plurality of clock signals to the plurality of clock domains, the plurality of clock signals including one or more clock signals for the first circuit and one or more clock signals for the second circuit; and means for autonomously determining based at least on the command or data whether the first circuit will perform the first function or will be idle in an upcoming period and whether the second circuit will perform the second function or be idle in the upcoming period, disabling one or more of the clock signals to the first circuit if the first circuit will be idle in the upcoming period, and disabling one or more of the clock signals to the second circuit if the second circuit will be idle in the upcoming period, wherein the one or more of the clock signals to the first circuit and the one or more of the clock signals to the second circuit may be independently disabled, and wherein the autonomously determining means is further configured to determine whether the first circuit will be functional in the upcoming period and is currently idle, and if the first circuit will be functional in the upcoming period and is currently idle, the software interface circuit enables the one or more clock signals to the first circuit prior to the upcoming period.

* * * * *